(12) United States Patent
Shpunt et al.

(10) Patent No.: US 9,772,720 B2
(45) Date of Patent: Sep. 26, 2017

(54) FLEXIBLE ROOM CONTROLS

(71) Applicant: APPLE INC., Cupertino, CA (US)

(72) Inventors: Alexander Shpunt, Portola Valley, CA (US); Raviv Erlich, Rehovot (IL); Ronen Akerman, Modiin (IL); Ran Halutz, Ramat Hasharon (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/181,422

(22) Filed: Jun. 14, 2016

(65) Prior Publication Data

US 2016/0291801 A1  Oct. 6, 2016

Related U.S. Application Data

(63) Continuation of application No. 14/179,580, filed on Feb. 13, 2014, now Pat. No. 9,430,138.

(60) Provisional application No. 61/764,554, filed on Feb. 14, 2013.

(51) Int. Cl.
*G06F 3/042* (2006.01)
*G06F 3/0488* (2013.01)
*G06F 3/01* (2006.01)
*G09G 3/02* (2006.01)
*G06T 7/521* (2017.01)

(52) U.S. Cl.
CPC .......... *G06F 3/0426* (2013.01); *G06F 3/017* (2013.01); *G06F 3/0488* (2013.01); *G06T 7/521* (2017.01); *G09G 3/025* (2013.01)

(58) Field of Classification Search
None
See application file for complete search history.

(56) References Cited

U.S. PATENT DOCUMENTS

| 6,361,173 | B1 | 3/2002 | Vlahos et al. |
| 2005/0117132 | A1 | 6/2005 | Agostinelli et al. |
| 2009/0190046 | A1 | 7/2009 | Kreiner et al. |
| 2011/0188054 | A1* | 8/2011 | Petronius ................ B23P 11/00 356/610 |
| 2014/0139426 | A1* | 5/2014 | Kryze ..................... G06F 3/011 345/156 |

OTHER PUBLICATIONS

AU Application # 2014217524 Office Action dated Sep. 22, 2016.

* cited by examiner

*Primary Examiner* — Nicholas Lee
(74) *Attorney, Agent, or Firm* — D. Kligler IP Services Ltd.

(57) ABSTRACT

Control apparatus includes an optical subsystem, which is configured to direct first light toward a scene that includes a hand of a user in proximity to a wall of a room and to receive the first light that is reflected from the scene, and to direct second light toward the wall so as to project an image of a control device onto the wall. A processor is configured to control the optical subsystem so as to generate, responsively to the received first light, a depth map of the scene, to process the depth map so as to detect a proximity of the hand to the wall in a location of the projected image, and to control electrical equipment in the room responsively to the proximity.

18 Claims, 2 Drawing Sheets

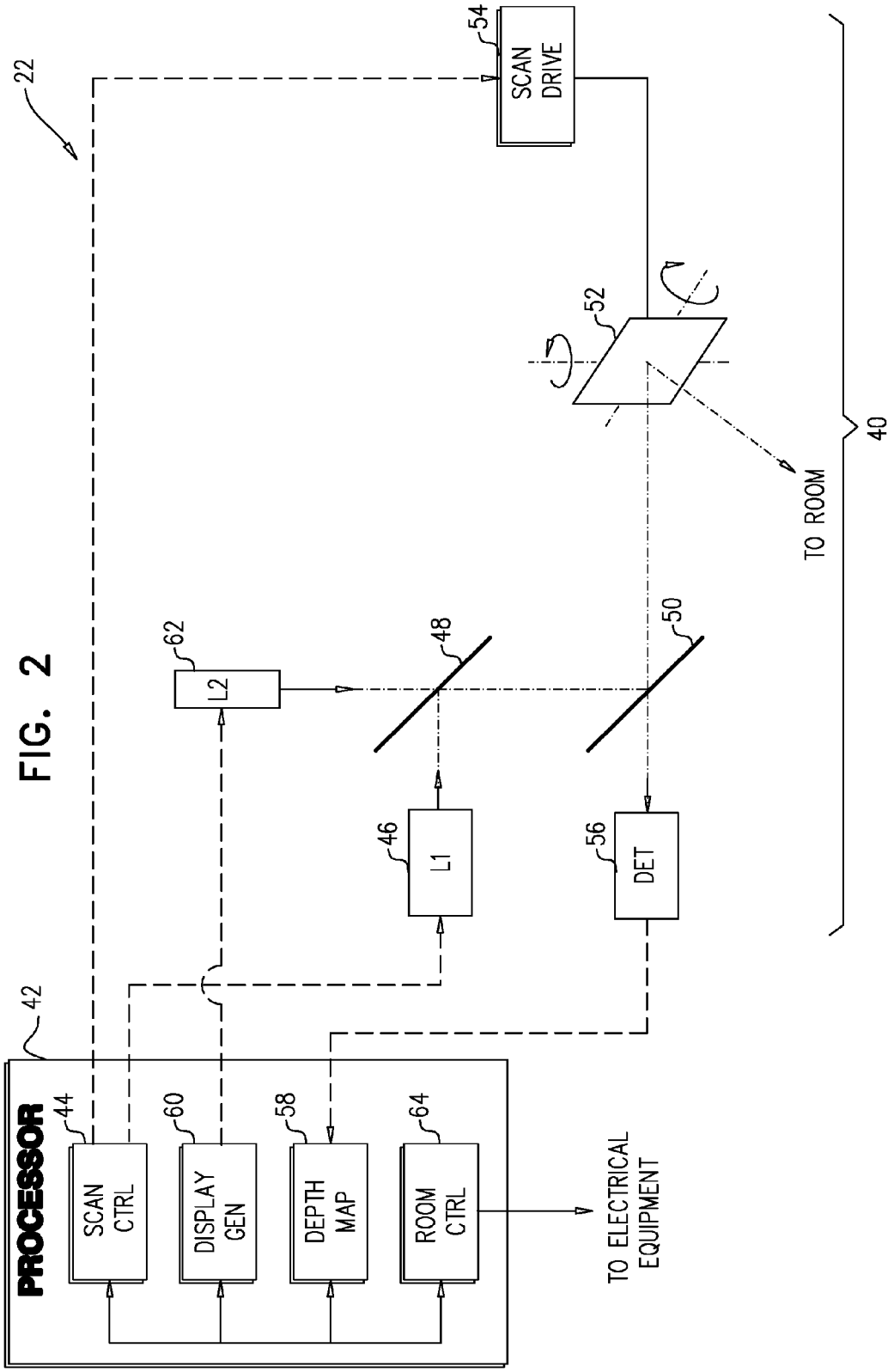

FLEXIBLE ROOM CONTROLS

CROSS-REFERENCE TO RELATED APPLICATIONS

This application is a continuation of U.S. patent application Ser. No. 14/179,580, filed Feb. 13, 2014, which claims the benefit of U.S. Provisional Patent Application 61/764,554, filed Feb. 14, 2013, which is incorporated herein by reference.

FIELD OF THE INVENTION

The present invention relates generally to human-machine interfaces, and particularly to user controls in a room or building.

BACKGROUND

Locations of room controls, such as electrical switches and climate-control thermostats, are generally chosen during the architectural design of a building, and the controls are then hard-wired in place within the walls during construction. If the resident subsequently wishes to add controls or move existing controls to another location, it will generally be necessary to break holes in the wall, run new wiring, and then repair and repaint.

Scanning projectors are known in the art. For example, U.S. Pat. No. 8,437,063, whose disclosure is incorporated herein by reference, describes a method of scanning a light beam using a microelectromechanical system (MEMS) device to drive first and second mirrors to scan a light beam along first and second axes.

As another example, U.S. Patent Application Publication 2013/0106692, whose disclosure is incorporated herein by reference, describes scanning projectors and image capture modules for 3D mapping. This publication describes apparatus for mapping that include an illumination module, which includes a radiation source, which is configured to emit a beam of radiation. A scanner receives and scans the beam over a selected angular range. Illumination optics project the scanned beam so as to create a pattern of spots extending over a region of interest. An imaging module captures an image of the pattern that is projected onto an object in the region of interest. A processor processes the image in order to construct a three-dimensional (3D) map of the object, also referred to as a depth map.

As yet another example, U.S. Patent Application Publication 2013/0106692, which is assigned to the assignee of the present patent application and whose disclosure is incorporated herein by reference, describes an improved content projection device, which is aware of objects in its field of view, recognizing such objects as suitable for projection of content thereon. The projection device may adapt to the geometry and character of the objects by controlling scale, distortion, focus of the projected content, and varying the projected content itself. Additionally or alternatively, the projection device may adapt the projected content according to the relationship of the viewer to the projected content, such as its gaze vector, distance from the surface onto which content is projected, and other similar parameters. The 2D/3D input device used to analyze the geometry for projection can also be used to interact with the projected content.

Another type of scanning depth engine is described in U.S. Patent Application Publication 2013/0207970, which is assigned to the assignee of the present patent application and whose disclosure is incorporated herein by reference. Mapping apparatus includes a transmitter, which emits a beam comprising pulses of light, and a scanner, which is configured to scan the beam, within a predefined scan range, over a scene. A receiver receives the light reflected from the scene and to generate an output indicative of a time of flight of the pulses to and from points in the scene. A processor is coupled to control the scanner so as to cause the beam to scan over a selected window within the scan range and to process the output of the receiver so as to generate a 3D map of a part of the scene that is within the selected window.

Depth sensing can be used to provide "virtual touchpad" functionality. For example, U.S. Patent Application Publication 2013/0283213, which is assigned to the assignee of the present patent application and whose disclosure is incorporated herein by reference, describes a method in which a computer receives a two-dimensional image (2D) containing at least a physical surface and segments the physical surface into one or more physical regions. A functionality is assigned to each of the regions, each of the functionalities corresponding to a tactile input device. A sequence of three-dimensional (3D) maps is received, containing at least a hand of a user of the computer positioned on one of the physical regions. The 3D maps are analyzed to detect a gesture performed by the user, and based on the gesture, an input is simulated for the tactile input device corresponding to the one of the physical regions.

Depth maps can be analyzed to find the pose of hands and fingers appearing in such maps. For example, U.S. Patent Application Publication 2013/0236089, which is assigned to the assignee of the present patent application and whose disclosure is incorporated herein by reference, describes a method in which descriptors are extracted from a depth map based on the depth values in a plurality of patches distributed in respective positions over the human hand. The extracted descriptors are matched to previously-stored descriptors in a database, and a pose of the human hand is estimated based on stored information associated with the matched descriptors.

SUMMARY

Embodiments of the present invention that are described hereinbelow provide methods and devices for facilitating user interaction with controls in an enclosed environment.

There is therefore provided, in accordance with an embodiment of the present invention, control apparatus, including an optical subsystem, which is configured to direct first light toward a scene that includes a hand of a user in proximity to a wall of a room and to receive the first light that is reflected from the scene, and to direct second light toward the wall so as to project an image of a control device onto the wall. A processor is configured to control the optical subsystem so as to generate, responsively to the received first light, a depth map of the scene, to process the depth map so as to detect a proximity of the hand to the wall in a location of the projected image, and to control electrical equipment in the room responsively to the proximity.

In some embodiments, the processor is configured to detect a contact by the hand with the wall by processing the depth map and to control the electrical equipment responsively to the detected contact. Additionally or alternatively, the processor may be configured, responsively to a gesture made by the hand while in proximity to the wall in the location of the projected image, to modify an appearance of the image of the control device or to modify the location at which the image of the control device is projected. Further additionally or alternatively, the processor may be configured, responsively to an input by the user, to add and project a further control device in a new location on the wall.

In a disclosed embodiment, the optical subsystem includes a first light source, which is configured to emit the first light as a train of pulses, and a detector, which is configured to detect a time of flight of the pulses that are reflected from the scene, and wherein the processor is configured to generate the depth map based on time-of-flight data received from the optical subsystem.

In some embodiments, the optical subsystem includes a scanner, which is configured to scan the first and the second light over the scene so as to generate the depth map and to project the image. Typically, the scanner includes a scanning mirror, which is configured to scan both the first light and the second light over the scene simultaneously. Optionally, the optical subsystem is configured to control the second light so that the image of the control device is not projected onto the hand while the mirror scans across the hand.

There is also provided, in accordance with an embodiment of the present invention, a method for controlling electrical equipment, which includes directing first light toward a scene that includes a hand of a user in proximity to a wall of a room. The first light that is reflected from the scene is received, and a depth map of the scene is generated responsively to the received first light. Second light is directed toward the wall so as to project an image of a control device onto the wall. The depth map is processed so as to detect a proximity of the hand to the wall in a location of the projected image. Electrical equipment in the room is controlled responsively to the proximity.

The present invention will be more fully understood from the following detailed description of the embodiments thereof, taken together with the drawings in which:

BRIEF DESCRIPTION OF THE DRAWINGS

FIG. 2 is a block diagram that schematically illustrates a projection-based room control unit, in accordance with an embodiment of the present invention.

DETAILED DESCRIPTION OF EMBODIMENTS

Figure 1:
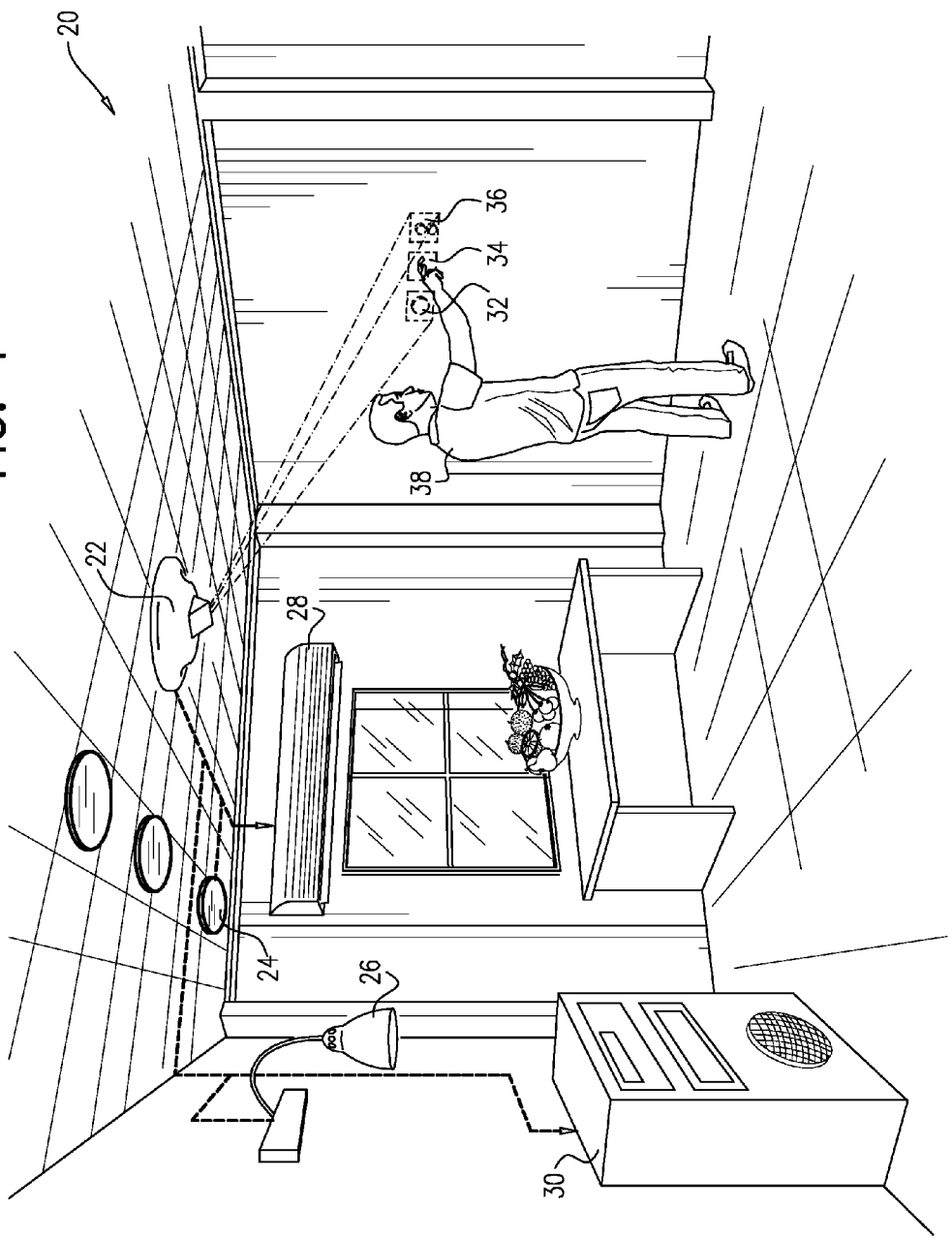
FIG. 1 is schematic, pictorial illustration of a room with a projection-based control system, in accordance with an embodiment of the present invention.

Embodiments of the present invention that are described herein below provide an alternative, flexible solution to the problem of placement of room controls. In these embodiments, as described in detail hereinbelow, a control unit projects images of control devices onto a wall of the room and remotely senses contact with and manipulation of the projected devices by a user (or more precisely, contact with the wall on which the images are projected and gestures of the user's hand and fingers while in this situation). The projected devices may range from a simple on/off switch to more complex controls, such as dials, sliders, and keypads.

The user may modify, add or remove control devices at will by interaction with the control system, such as by holding and dragging a projected device along the wall to a new location. The present system thus mimics the familiar control paradigm in which the electrical equipment in a given room is controlled by switches on the wall, while providing a level of flexibility that is generally associated only with wireless remote controls. In contrast to wireless systems, however, the user can interact with the present system without having to carry (or potentially misplace) any sort of physical wireless device.

FIG. 1 is schematic, pictorial illustration of a room with a projection-based control system 20, in accordance with an embodiment of the present invention. The key element of system 20 is a room control unit 22, which controls the operation of electrical equipment in the room, such as lights 24, 26, an air conditioner 28, and a media system 30 (which may play audio, video or other content), for example. These items of equipment are typically wired through the walls and ceiling of the room to control unit 22, rather than wiring them to conventional electrical control devices mounted on the walls of the room. Alternatively, control unit 22 may operate items of electrical equipment via wireless links, as are known in the art.

Room control unit 22, which may be conveniently mounted on or in the ceiling as shown in FIG. 1, projects images of control devices 32, 34, 36 onto a wall of the room. A user 38 interacts with these projected devices by gestures of his hand and fingers, as though they were actual, electrical controls. A sensor in control unit 22 detects contact between the user's fingers and the projected devices and controls the electrical equipment in the room accordingly. Thus, for example, user 38 may touch an on/off switch in device 36 to cause control unit to turn light 26 on or off, or may turn a dial in device 32 to cause the control unit to brighten or dim lights 24. As another example, user 38 may move a slider in device 34 to change the room temperature (and control unit 22 may project the actual and/or target temperature onto device 34, as well, as though the device were an actual thermostat). More complex control devices, including multiple keys and display elements, may be similarly projected and manipulated.

As explained earlier, control devices 32, 34, 36 that appear in FIG. 1 are no more than projected images on a flat wall. Control unit 22 typically captures a depth map (also known as a 3D map or 3D image) of the area of each control device and processes the depth map in order to determine that the user has contacted the wall at the location of a given device and to identify movements (gestures) made by the user in relation to the projected device. Technologies that may be used in control unit 22 to project the device images and to detect contact with the devices and manipulation of the devices by the user's hand using 3D mapping are described, for example, in the references cited above in the Background section. Details of a possible implementation of control unit 22 based on these technologies are described below with reference to FIG. 2.

As noted earlier, one of the advantages of system 20 is that the locations and forms of control devices 32, 34, 36 can be changed by user 38 at will. For this purpose, control unit 22 may implement a touch interface with functionality similar to that offered by current touch screens. For example, when control unit 22 senses extended contact between the user's finger and one of the control devices, the control unit selects and visually highlights the device. The user may then drag and drop the control device at a new location by sliding his finger along the wall of the room to the desired location. Control unit 22 may simultaneously project a moving image of the control device along the wall next to the user's finger until the user "drops" the device in its new location.

By the same token, user 38 may use appropriate gestures or other inputs to enlarge or shrink the control devices, as well as copying a device appearing on the wall to a location on another wall. In this manner, for example, the user will be able to add a "switch" for light 26, so that it will be possible to turn the light on and off from both a location next to the door of the room and a location next to the light itself. No additional wiring or other modifications whatsoever are needed for this purpose. For more complex operations, such as generating new controls, control unit 22 may have a wired or wireless interface to a computer (not shown) with suitable software for this purpose.

FIG. 2 is a block diagram that schematically shows details of room control unit 22, in accordance with an embodiment of the present invention. Control unit 22 comprises an optical subsystem 40, which operates under the control of a processor 42. Typically, processor 42 comprises a microprocessor with suitable software for carrying out the functions described herein, with the possible addition of dedicated hardware logic (embodied in an ASIC chip, for example) and suitable interfaces for controlling and processing signals from optical subsystem 40. The key functions of processor 42 are represented by functional blocks shown in FIG. 2, which are described hereinbelow.

For purposes of depth mapping, optical subsystem 40 may operate on principles similar to those described in the above-mentioned U.S. Patent Application Publication 2013/0207970. A scan controller 44 drives a light source 46, such as an infrared laser diode (labeled L1), to emit a train of short pulses of light. (The term "light" refers to any or all of visible, infrared and ultraviolet radiation.) The light pulses reflect from a pair of beamsplitters 48 and 50 and then strike a scanning mirror 52. If light source 46 is polarized, beamsplitter 50 may be polarization-dependent, while beamsplitter 48 may be dichroic, so as to preferentially reflect the wavelength band of light source 46. Optical subsystem 40 may also comprise focusing optics, such as lenses, for collimating the laser beam and collecting reflected light, but these elements are omitted here for the sake of simplicity.

Mirror 52 rotates about two orthogonal axes in order to scan the pulses from light source 46 over an area of interest. The mirror may be a miniature mirror that is produced and driven, for example, using MEMS technology described in the above-mentioned U.S. Pat. No. 8,437,063, as well as in U.S. Patent Application Publication 2013/0207970. A scan driver 54 typically drives the mirror to rotate about the axes in a raster pattern. Scan controller 44 signals driver 54 to control the parameters of the scan depending on the location of user in the room, and specifically the location of the user's hand. Thus, mirror 52 may initially scan a wide area of the room, and then once processor 42 identifies the user in the room, the scan may zoom in, with higher resolution, to the area of the user's hand and control devices 32, 34, 36 that the user is touching or is about to touch. In this manner, control unit 22 is able to detect the user's hand posture and gestures with greater precision.

The light pulses directed by mirror 52 into the room reflect off objects in the room (including the body of user 38 and the wall on which control devices 32, 34, 36 are projected). The part of the reflected light that returns to control unit 22 is then reflected by mirror 52 via beamsplitter 50 onto a detector 56. This detector may comprise any suitable sort of sensitive, high-speed light detector, such as an avalanche photodiode. Detector 56 outputs electrical pulses corresponding to the pulses of reflected light that it has received. The time delay between the pulses emitted by light source 46 and the pulses received by detector 56 is indicative of the round-trip time of flight of the light to and from the object from which the pulses have reflected, and thus of the distance from control unit 22 to the object surface. A depth mapping circuit 58 in processor 42 converts the time-of-flight data into a depth map, which shows the location of the user's hand relative to the control devices that are projected onto the wall.

A display generator 60 drives a visible light source 62 to generate the images of control devices 32, 34, 36 on the wall. Light source 62 (labeled L2) may comprise, for example a laser diode or LED, or a set of two or three laser diodes or LEDs that emit light of different colors under the control of display generator 60. The light emitted by light source 62 passes through beamsplitter 48 and then reflects from beamsplitter 50 and mirror 52 onto the wall of the room. Thus, in the pictured configuration, the same scanning mirror 52 is used simultaneously both in generating the 3D map and in projecting the control device images. In an alternative implementation, control unit 22 may comprise a separate scanning mirror (not shown) for projecting the images of control devices 32, 34, 36 independently of the depth mapping scan of mirror 52.

Display generator 60 controls light source 62 so that the beam that it emits draws the control devices on the wall in the course of the raster scan of mirror 52. The depth map of the wall that is provided to display generator 60 by mapping circuit 58 enables the display generator to adjust the geometry of the images of the control devices that it projects so that the images appear on the wall with the proper (typically rectangular) shape and form, compensating for the varying angle and distance of projection. The display generator may, additionally, control light source 62 while mirror scans across the user's hand, so that the images of the control devices are not projected onto the hand. Techniques for adaptive projection onto various sorts of surfaces based on depth maps of the surfaces are further described in the above-mentioned U.S. Patent Application Publications 2013/0106692, 2013/0127854 and 2013/0283213.

A room controller 64 process the depth maps provided by mapping circuit 58 in order to identify the location and posture of the user's hand in proximity to control devices 32, 34, 36. Information extracted by controller typically includes whether the user's finger is touching one of the control devices and any movements that the finger is making relative to the control device that it is touching. Techniques that may be used specifically for recognizing postures and movements of the hand and fingers in a depth map are described, for example, in the above-mentioned U.S. Patent Application Publication 2013/0236089 and in U.S. patent application Ser. No. 13/663,518, filed Oct. 30, 2012, which is assigned to the assignee of the present patent application and whose disclosure is incorporated herein by reference. Based on the finger positions and gestures, controller 64 determines the changes to be made in the operation of the electrical equipment in the room (such as turning lights 24, 26 on or off, or making them brighter or dimmer, or changing the temperature setting of air conditioner 28 or the volume of audio system 30), and then applies these changes to the appropriate physical controls of the equipment.

In practical terms, there may be some ambiguity in detecting when the user's finger actually touches the wall onto which control devices 32, 34, 36 are projected, particularly when the user's hand is mapped from behind as shown in FIG. 1. To alleviate possible problems in this regard, processor 42 may learn the geometry of each user's hand, and specifically the characteristics of the fingers, and may then apply this geometry in deciding when a finger is in contact with a given control device. For example, control unit 22 may enter sleep mode when no one is in the room, scanning the room occasionally to detect user presence. When a user is detected, control unit 22 wakes up, locates and tracks movement of the user's hands, and thus computes the parameters of a predefined geometric hand model, which it applies in subsequent touch detection. Alternatively or additionally, processor 42 may detect particular control gestures in proximity to control devices 32, 34, 36 without relying specifically on touch detection.

Although the embodiment described above relates to a particular optical and electronic configuration of system 20, and particularly of control unit 22, the principles of the present invention may similarly be applied using different optical and electronic arrangements. Specifically, control unit 22 may, for example, implement other methods of depth mapping that are known in the art, such as methods based on projection and sensing of patterns of spots or other sorts of structured light, or based on stereoscopic imaging. Similarly, the control unit may incorporate other means for projecting control devices 32, 34, 36, such as a Digital Light Processing (DLP) projector. Other applications of the sorts of projected control devices that are described above are also considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Control apparatus, comprising:
   a first light source, which is configured to emit a first beam of infrared light;
   a second light source, which is configured to emit a second beam of visible light;
   an optical scanner, comprising at least one scanning mirror, which is configured to scan both the first and second beams over a scene that includes a hand of a user in proximity to a wall of a room;
   a detector, which is configured to receive the infrared light that is reflected from the scene; and
   a processor, which is configured to control the second light source so as to project an image of a control device onto the wall, and to generate, responsively to the infrared light received by the detector, a depth map of the scene, to process the depth map so as to detect a proximity of the hand to the wall in a location of the projected image, and to control electrical equipment in the room responsively to the proximity.

2. The apparatus according to claim 1, wherein the processor is configured to detect a contact by the hand with the wall by processing the depth map and to control the electrical equipment responsively to the detected contact.

3. The apparatus according to claim 1, wherein the processor is configured, responsively to a gesture made by the hand while in proximity to the wall in the location of the projected image, to modify an appearance of the image of the control device.

4. The apparatus according to claim 1, wherein the processor is configured, responsively to a gesture made by the hand while in proximity to the wall in the location of the projected image, to modify the location at which the image of the control device is projected.

5. The apparatus according to claim 1, wherein the processor is configured, responsively to an input by the user, to add and project a further control device in a new location on the wall.

6. The apparatus according to claim 1, wherein the first light source is configured to emit the infrared light as a train of pulses, and the detector is configured to detect a time of flight of the pulses that are reflected from the scene, and wherein the processor is configured to generate the depth map based on time-of-flight data received from the detector.

7. The apparatus according to claim 1, wherein the at least one scanning mirror comprises a scanning mirror that is configured to scan both the first beam and the second beam over the scene simultaneously.

8. The apparatus according to claim 1, wherein the at least one scanning mirror comprises a first scanning mirror, which is configured to scan the first beam over the scene, and a second scanning mirror, which is configured to scan the second beam over the scene.

9. The apparatus according to claim 1, wherein the optical scanner is configured to direct the infrared light that is reflected from scene onto the detector.

10. A method for controlling electrical equipment, comprising:
    generating a first beam of infrared light and a second beam of visible light;
    optically scanning both the first and second beams over a scene that includes a hand of a user in proximity to a wall of a room, by reflecting the first beam and the second beam from at least one scanning mirror;
    receiving the infrared light that is reflected from the scene;
    generating, responsively to the received infrared reflected light, a depth map of the scene;
    controlling the first beam of visible light while scanning the first and second beams so as to project an image of a control device onto the wall;
    processing the depth map so as to detect a proximity of the hand to the wall in a location of the projected image; and
    controlling electrical equipment in the room responsively to the proximity.

11. The method according to claim 10, wherein processing the depth map comprises detecting a contact by the hand with the wall, wherein the electrical equipment is controlled responsively to the detected contact.

12. The method according to claim 10, and comprising modifying an appearance of the image of the control device responsively to a gesture made by the hand while in proximity to the wall.

13. The method according to claim 10, and comprising modifying the location at which the image of the control device is projected responsively to a gesture made by the hand while in proximity to the wall.

14. The method according to claim 10, and comprising adding and projecting a further control device in a new location on the wall responsively to an input by the user.

15. The method according to claim 10, wherein generating the first beam of infrared light comprises generating a train of pulses, and wherein receiving the reflected infrared light comprises detecting a time of flight of the pulses that are reflected from the scene, and wherein generating the depth map comprises processing the time of flight of the pulses to derive depth data.

16. The method according to claim 10, wherein reflecting the first beam and the second beam from the at least one scanning mirror comprises reflecting the first beam and the second beam from a scanning mirror that scans both the infrared light and the visible light over the scene simultaneously.

17. The method according to claim 10, wherein reflecting the first beam and the second beam from the at least one scanning mirror comprises reflecting the first beam from a first scanning mirror, which is configured to scan the first beam over the scene, and reflecting the second beam from a second scanning mirror, which is configured to scan the second beam over the scene.

18. The method according to claim 10, wherein receiving the infrared light that is reflected from scene comprises applying an optical scanner to direct the reflected infrared light onto a detector.

\* \* \* \* \*